US011415773B2

(12) United States Patent
Shirai

(10) Patent No.: US 11,415,773 B2
(45) Date of Patent: Aug. 16, 2022

(54) APPARATUS AND LENS APPARATUS

(71) Applicant: CANON KABUSHIKI KAISHA, Tokyo (JP)

(72) Inventor: Kunihiro Shirai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 583 days.

(21) Appl. No.: 16/435,351

(22) Filed: Jun. 7, 2019

(65) Prior Publication Data
US 2019/0384033 A1 Dec. 19, 2019

(30) Foreign Application Priority Data
Jun. 13, 2018 (JP) .............................. JP2018-112753

(51) Int. Cl.
 *G02B 7/04* (2021.01)
 *H04N 5/225* (2006.01)
 *H04N 5/232* (2006.01)
 *G02B 27/00* (2006.01)

(52) U.S. Cl.
 CPC ........... *G02B 7/04* (2013.01); *G02B 27/0025* (2013.01); *H04N 5/2254* (2013.01); *H04N 5/23212* (2013.01); *H04N 5/23229* (2013.01)

(58) Field of Classification Search
 CPC .................. G02B 7/04; G02B 27/0025; H04N 5/23229; H04N 5/232122; H04N 5/23245; H04N 5/232; H04N 5/2254; H04N 5/232123; H04N 5/3572; H04N 5/23212; G06T 5/006
 See application file for complete search history.

(56) References Cited

U.S. PATENT DOCUMENTS

| 8,818,101 | B1* | 8/2014 | Lim ...................... G06T 3/4038 |
| | | | 382/277 |
| 10,140,687 | B1* | 11/2018 | Engel ................... H04N 5/3572 |
| 10,186,021 | B2* | 1/2019 | Koyano ............... H04N 5/2252 |
| 10,389,931 | B2* | 8/2019 | Yoshimura .......... H04N 5/23229 |
| 2003/0141433 | A1* | 7/2003 | Gordon ............. H01L 27/14601 |
| | | | 257/E27.151 |
| 2004/0109615 | A1 | 6/2004 | Nakamura |
| 2009/0268078 | A1 | 10/2009 | Miyazaki |
| 2011/0043667 | A1* | 2/2011 | Kotani ................. H04N 5/2353 |
| | | | 348/241 |

(Continued)

FOREIGN PATENT DOCUMENTS

| CN | 104732542 A | 6/2015 |
| CN | 105306859 A | 2/2016 |

(Continued)

*Primary Examiner* — Vinh T Lam
(74) *Attorney, Agent, or Firm* — Canon U.S.A., Inc. IP Divsion

(57) ABSTRACT

An apparatus for generating a high-quality image, for example, in a case of correcting a distortion in an image is provided. The apparatus includes an acquisition unit configured to acquire first information about a correction value for correcting a distortion of an image acquired by capturing an optical image formed by a lens and second information for correcting a change in an angle of view which is caused by the correction of the distortion, and a processing unit configured to generate an image in which the distortion is corrected using the first information and the second information.

31 Claims, 15 Drawing Sheets

(56) References Cited

U.S. PATENT DOCUMENTS

| | | | | |
|---|---|---|---|---|
| 2011/0128406 A1* | 6/2011 | Shirai | ............... | H04N 5/3572 348/222.1 |
| 2013/0124159 A1* | 5/2013 | Chen | ............... | H04N 9/04515 703/2 |
| 2014/0176755 A1* | 6/2014 | Narita | ............... | H04N 5/23251 348/222.1 |
| 2015/0009345 A1* | 1/2015 | Tsubaki | ............ | H04N 5/23287 348/208.2 |
| 2015/0358545 A1 | 12/2015 | Wakamatsu | | |
| 2016/0112646 A1* | 4/2016 | Tsunoda | ............ | H04N 5/3572 348/240.2 |
| 2016/0379335 A1* | 12/2016 | Kwon | ................ | G06T 5/006 345/506 |
| 2017/0070732 A1* | 3/2017 | Roulet | ............... | G02B 13/06 |
| 2017/0142344 A1 | 5/2017 | Matsunaga | | |
| 2017/0187959 A1* | 6/2017 | Nishigori | .......... | H04N 9/04517 |
| 2017/0237882 A1* | 8/2017 | Shiohara | ............... | G09G 5/00 348/148 |
| 2018/0124318 A1* | 5/2018 | Koizumi | ........ | H04N 5/232125 |
| 2018/0126903 A1* | 5/2018 | Herrmann | ............ | G06T 3/0018 |
| 2018/0167568 A1* | 6/2018 | Shirai | ................... | G03B 17/14 |
| 2018/0307040 A1* | 10/2018 | Miyazawa | ........ | H04N 5/23296 |
| 2019/0004282 A1* | 1/2019 | Park | ................... | H04N 5/23212 |
| 2019/0102868 A1* | 4/2019 | Beric | ................... | H04N 5/3572 |
| 2019/0384033 A1* | 12/2019 | Shirai | ..................... | G02B 7/04 |

FOREIGN PATENT DOCUMENTS

| | | | | | |
|---|---|---|---|---|---|
| CN | 107566685 | A | | 1/2018 | |
| GB | 2458339 | A | * | 9/2009 | ........... G06T 5/006 |
| JP | 2009-290863 | A | | 12/2009 | |
| JP | 2014-127773 | A | | 7/2014 | |
| JP | 2017-046105 | A | | 3/2017 | |
| WO | WO-2010065897 | A2 | * | 6/2010 | ........... G03B 21/00 |

\* cited by examiner

| FOCAL LENGTH | Z01 | Z02 | Z03 | Z04 | Z05 | Z06 | Z07 |
|---|---|---|---|---|---|---|---|
| ENLARGEMENT RATE | x1 | x1 | x1 | x1.01 | x1.02 | x1.03 | x1.04 |

| FOCAL LENGTH | Z01 | Z02 | Z03 | Z04 | Z05 | Z06 | Z07 |
|---|---|---|---|---|---|---|---|
| SHIFT AMOUNT | 0 | 0 | 0 | 0.01 | 0.02 | 0.03 | 0.04 |

APPARATUS AND LENS APPARATUS

BACKGROUND OF THE INVENTION

Field of the Invention

The aspect of the embodiments relates to a technique for correcting an image aberration arising from an imaging optical system.

Description of the Related Art

The quality of an image captured by an image capturing apparatus, such as a digital camera, can degrade due to aberrations of an imaging optical system attached to the image capturing apparatus. A lens of an image capturing optical system is expected to satisfy an ideal condition that "a subject and an optical image formed by the lens are similar in figure", but in practice it is difficult to satisfy the ideal condition due to a distortion of the lens. The distortion is an aberration that causes an optical image of a subject to appear distorted. For example, an aberration that causes an optical image to be distorted in a shape expanded in a diagonal direction is referred to as a pincushion distortion, whereas an aberration that causes an optical image to be distorted in a shape shrunk in a diagonal direction is referred to as a barrel distortion.

In typical techniques for electronically correcting such a distortion in a captured image, an image is resized for each image height according to the amount of the distortion. Japanese Patent Application Laid-Open No. 2014-127773 discusses an example of such a technique in which geometric deformation processing is performed to correct a distortion. In particular, Japanese Patent Application Laid-Open No. 2014-127773 discusses a technique in which whether or not a reference region for geometric deformation processing fits inside an image capturing region is determined. If the reference region does not fit inside the image capturing region, an upper limit value is set for a shift amount of the reference region in such a manner that the reference region fits inside the image capturing region. Geometric deformation processing is then performed using a parameter based on the upper limit value. Meanwhile, an image output from an image capturing apparatus is expected to include a preset number of output pixels, so that resizing processing is often performed on an image having undergone distortion correction so that the number of output pixels is adjusted to the preset number of output pixels set to the image capturing apparatus. However, an in-focus position is often changed during, for example, moving image capturing, and the change in the in-focus position causes an amount of distortion to change. Thus, if resizing processing is performed on an image having undergone distortion correction, a moving image may be obtained with the size of a subject image changed. This also applies to a case of continuously capturing still images while changing an in-focus position. In such cases, the size of the subject image is prevented from changing if an image of the preset number of output pixels that is set to the image capturing apparatus is constantly cut from the image having undergone distortion correction.

However, in a case where, for example, a geometric transformation is performed to shrink an image as in the correction of a pincushion distortion, an output image can include a blank region with no image data (the correction of a pincushion distortion may result in no data at each of the four corners in the diagonal direction). In the technique discussed in Japanese Patent Application Laid-Open No. 2014-127773 described above, if the reference region for geometric transformation processing does not fit inside the image capturing region, the correction is performed so that the reference region fits inside the image capturing region. This enables prevention of a blank region from being generated to some extent. However, a case in which a distortion cannot be corrected is presumably occur frequently depending on the conditions. Thus, in some cases using the conventional technique, a high-quality image in which a distortion is adequately corrected cannot be obtained.

SUMMARY OF THE INVENTION

According to an aspect of the embodiments, an apparatus includes at least one processor, and a memory including instructions that, when executed by the processor, cause the at least one processor to acquire first information about a correction value for correcting a distortion of an image acquired by capturing an optical image formed by a lens and second information for correcting a change in an angle of view which is caused by the correction of the distortion, and generate an image in which the distortion is corrected using the first information and the second information.

Further features of the disclosure will become apparent from the following description of exemplary embodiments with reference to the attached drawings.

DESCRIPTION OF THE EMBODIMENTS

Various exemplary embodiments of the disclosure will be described in detail below with reference to the accompanying drawings.

An image processing apparatus according to an exemplary embodiment of the disclosure is applied to, for example, an image capturing apparatus configured to capture still and moving images and is capable of implementing distortion correction processing for reducing change in angle of view which is caused by the driving of a focus lens at the time of, for example, capturing moving images or continuously capturing still images.

Figure 1:
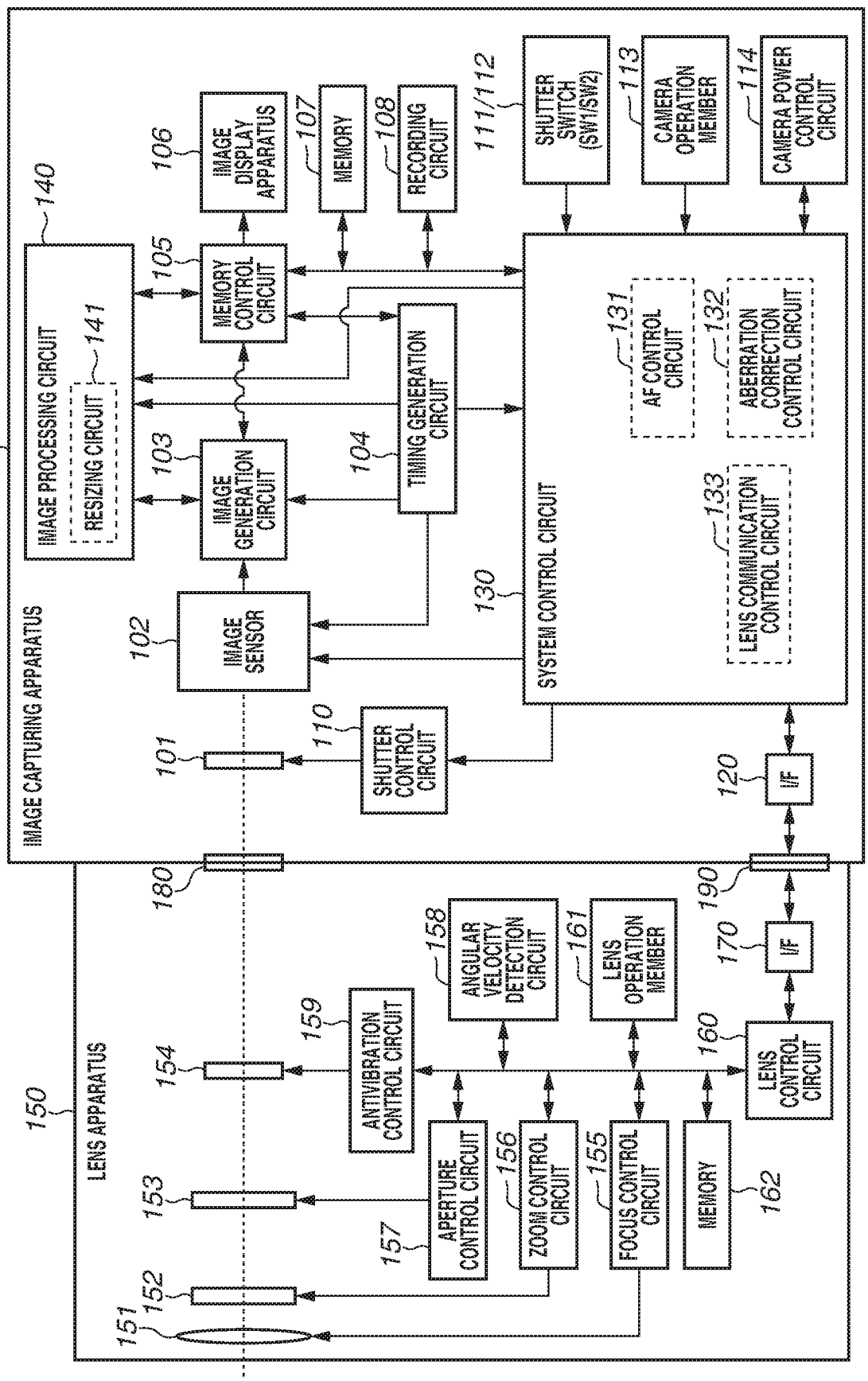
FIG. 1 illustrates an example of a configuration of an image capturing apparatus and a lens apparatus according to an exemplary embodiment.

A first exemplary embodiment of the disclosure will be described below. FIG. 1 is a block diagram illustrating a schematic configuration of an image capturing apparatus 100, which is an application example of the image processing apparatus according to the present exemplary embodiment. The image capturing apparatus 100 according to the present exemplary embodiment is, for example, a lens-exchangeable digital camera including a distortion correction function of suppressing change in angle of view which is caused by the driving of a focus lens at the time of capturing a moving image. While the lens-exchangeable digital camera is described as an example of the image capturing apparatus 100 in the present exemplary embodiment, the image capturing apparatus 100 may be a lens-integrated digital camera.

The image capturing apparatus 100 according to the present exemplary embodiment includes a lens mount 180. The lens mount 180 is provided with an attachment mechanism with which a lens apparatus 150 is attachable and detachable. In the example illustrated in FIG. 1, the lens apparatus 150 is attached to the lens mount 180 of the image capturing apparatus 100.

The lens apparatus 150 includes an imaging optical system and a control system. The imaging optical system includes a focus lens 151, a zoom lens 152, a diaphragm 153, and an antivibration control lens 154. The control system controls the imaging optical system and transmission/reception of various information. The imaging optical system of the lens apparatus 150 forms an optical image of a subject on an image capturing surface of an image sensor 102 of the image capturing apparatus 100. The focus lens 151, the zoom lens 152, and the antivibration control lens 154 may be a lens group including a plurality of lenses. The imaging optical system, the control system, and other configurations of the lens apparatus 150 will be described below.

A shutter 101 is a focal plane shutter.

A shutter control circuit 110 controls driving for opening or closing the shutter 101 based on a control signal from a system control circuit 130.

The image sensor 102 is, for example, a charge-coupled device (CCD) sensor or complementary metal oxide semiconductor (CMOS) sensor and transforms a subject image formed by the lens apparatus 150 into an electric signal. The image sensor 102 may include a plurality of focus detection pixels for image plane phase difference detection. An image generation circuit 103 transforms a captured analog signal output from the image sensor 102 into digital data to thereby generate captured image data. The captured image data generated by the image generation circuit 103 is transmitted to a memory control circuit 105 and an image processing circuit 140.

A timing generation circuit 104 supplies a clock signal and a synchronization signal to the image sensor 102, the image generation circuit 103, the memory control circuit 105, the system control circuit 130, and the image processing circuit 140.

The memory control circuit 105 controls writing to and reading from a memory 107, writing to and reading from a recording circuit 108, generation and output of an image by using the image generation circuit 103, processing and output of an image by using the image processing circuit 140, and display of an image by an image display apparatus 106, under the control of the system control circuit 130. For example, the image data output from the image generation circuit 103 is written to the memory 107 or the recording circuit 108 via the image processing circuit 140 and/or the memory control circuit 105. The memory control circuit 105 further controls the timing generation circuit 104 under the control of the system control circuit 130 and controls output of the clock signals and the synchronization signals to the components.

The memory 107 stores captured still image data and moving image data. The memory 107 is also used as a work area for the system control circuit 130. Information for the image processing to be performed by the image processing circuit 140 may be stored in advance in the memory 107 as needed.

The recording circuit 108 includes a built-in non-volatile memory in the image capturing apparatus 100 or a non-volatile memory detachable from the image capturing apparatus 100, and stores captured still image data and moving image data.

The image display apparatus 106 includes a liquid crystal display (LCD). In a case where the image display apparatus 106 is used as an electronic view finder (EVF), image data captured using the image sensor 102 is successively displayed to thereby realize an EVF function. In image reproduction, an image recorded on the memory 107 or the recording circuit 108 is read and displayed on the image display apparatus 106.

A shutter switch 111 is a switch SW1 which is switched on with a shutter button being pressed partway down. A shutter switch 112 is a switch SW2 which is switched on with the shutter button being pressed all the way down. If the switch SW1 is switched on, the system control circuit 130 starts controlling camera operations, such as auto-focus (AF) processing, auto-exposure (AE) processing, and automatic white balance (AWB) processing. If the switch SW2 is switched on, the system control circuit 130 controls the image sensor 102, the memory control circuit 105, and the shutter control circuit 110 and controls the lens apparatus 150 via an interface (I/F) 120 to start image capturing in the image capturing apparatus 100. The system control circuit 130 causes the image processing circuit 140 to perform image processing, and causes the memory 107 and/or the recording circuit 108 to record image data.

A camera operation member 113 includes various buttons, touch panel, and power on/off button, and is configured to receive a user operation and output an instruction provided with the user operation (user instruction) to the system control circuit 130. The system control circuit 130 switches various functions of the image capturing apparatus 100, e.g., an operation mode such as an AF mode and AE mode, based on the user instruction received via the camera operation member 113.

A camera power control circuit 114 manages external and built-in batteries. If a battery is detached or the remaining battery becomes exhausted, the camera power control circuit 114 performs an emergency shutdown as a camera control. At this time, the system control circuit 130 also shuts down the power supply to the lens apparatus 150.

The I/F 120 is an interface for transmitting and receiving various information and control commands to and from the lens apparatus 150. The I/F 120 is connected to an I/F 170 of the lens apparatus 150 via a connector 190. The I/F 120 performs communication using an electric signal between the system control circuit 130 in the image capturing apparatus 100 and a lens control circuit 160 in the lens apparatus 150.

The system control circuit 130 acquires information from the switches SW1 and SW2, the memory control circuit 105, and the camera operation member 113. The system control circuit 130 controls the image sensor 102, the memory control circuit 105, the shutter control circuit 110, and the lens apparatus 150 via the I/F 120 based on the acquired information, thus controlling the entire camera.

The system control circuit 130 performs various control and processing as an AF control circuit 131, a lens communication control circuit 133, and an aberration correction control circuit 132.

The AF control circuit 131 performs AF processing and AF control at the image capturing apparatus 100. The AF control circuit 131 computes, as AF processing corresponding to the user-set AF mode, a focus lens driving amount based on lens information, such as a focus position and focal length, acquired from the lens apparatus 150 via the I/F 120 and an AF evaluation value (described below). In the case of the image capturing apparatus 100 according to the present exemplary embodiment, a phase difference AF mode, a contrast AF mode, and an image plane phase difference AF mode are prepared as the AF mode, and any one of these AF modes is set through user selection or automatic selection. In the case of the phase difference AF mode, the AF control circuit 131 computes a focus driving amount using a phase difference AF evaluation value generated by a focus state judgement circuit (not illustrated) from a phase difference detection signal detected by a focus detection sensor (not illustrated). In the case of the contrast AF mode, the AF control circuit 131 computes the focus driving amount using a contrast AF evaluation value computed by the image processing circuit 140. In the case of the image plane phase difference AF mode, the AF control circuit 131 computes the focus lens driving amount using an image capturing plane phase difference AF evaluation value output from a plurality of focus detection pixels set to the image sensor 102. While the AF mode considered in the present exemplary embodiment is the image plane phase difference AF mode, the AF mode is not limited to the image plane phase difference AF mode, and the AF mode can be the phase difference AF mode or the contrast AF mode, or manual focusing can be performed. In the image capturing apparatus 100 according to the present exemplary embodiment, an AF evaluation mode is automatically selectable or selectable by a user from a single-point AF mode, a multi-point AF mode, and a face detection AF mode. In the single-point AF mode, the AF is performed using a single AF point. In the multi-point AF mode, the AF is performed using a plurality of AF points. In the face detection AF mode, the face of a subject is focused on. The AF control circuit 131 also performs control to change an AF frame position for evaluation value computation according to the set AF evaluation mode. The focus lens driving amount computed by the AF control circuit 131 is transmitted from the lens communication control circuit 133 to the lens apparatus 150 via the I/F 120.

The lens communication control circuit 133 controls communication processing between the image capturing apparatus 100 and the lens apparatus 150. If the lens communication control circuit 133 detects that the lens apparatus 150 is attached via the I/F 120, the lens communication control circuit 133 starts communication between the image capturing apparatus 100 and the lens apparatus 150, receives lens information at a desired timing, and transmits camera information and a driving command. For example, in a case where the image capturing apparatus 100 is in a finder imaging mode, the lens communication control circuit 133 communicates with the lens apparatus 150 at a desired timing. In a case where the image capturing apparatus 100 is in a live-view imaging mode, the lens communication control circuit 133 can perform communication at a timing based on an image capturing synchronization signal output from the timing generation circuit 104, besides the desired timing. In the case where communication is performed at the timing based on the image capturing synchronization signal, if an image capturing synchronization signal is input from the timing generation circuit 104, the lens communication control circuit 133 collectively receives lens information (focus lens position, focus lens state, aperture state, focal length).

The aberration correction control circuit 132 acquires information indicating an aberration amount corresponding to a focus position and focal length position (hereinafter, "aberration correction information") from the lens apparatus 150 via the I/F 120 and the lens communication control circuit 133. In a case where the aberration correction information about the lens apparatus 150 is stored in advance in the memory 107, the aberration correction control circuit 132 can acquire the information from the memory 107. In the present exemplary embodiment, a distortion correction is described as an example of a correction of an aberration arising from the imaging optical system of the lens apparatus 150. Thus, the aberration correction control circuit 132 acquires distortion correction information. The aberration correction control circuit 132, based on the acquired distortion correction information, calculates a correction amount for the image capturing mode and sets a distortion correction amount for a resizing circuit 141 in the image processing circuit 140.

The image processing circuit 140 performs predetermined pixel interpolation processing and color conversion processing on image data acquired from the image generation circuit 103 or from the memory control circuit 105 and generates image data. The image processing circuit 140 can perform various computation processing using image data. The image processing circuit 140 acquires image magnification change characteristics information and distortion characteristics information from the lens apparatus 150 via the I/F 120 and the system control circuit 130. In a case where the image magnification change characteristics information and the distortion characteristics information are stored in advance in the memory 107, the image processing circuit 140 can acquire the information from the memory 107. The image processing circuit 140 executes aberration correction processing based on the acquired information at the resizing circuit 141. The resizing circuit 141 also performs image enlargement/shrinking processing, e.g., enlargement/shrinking processing for a case where a resizing rate differs based on an image height, as in the distortion correction. The image processing circuit 140 can perform aberration correction processing on a captured image generated from an optical image formed by the lens apparatus 150 and also on a separately-acquired captured image recorded in the recording circuit 108. Details of the distortion correction processing performed by the image processing circuit 140 in the present exemplary embodiment will be described below.

Next, the imaging optical system and the control system of the lens apparatus 150 and other configurations will be described below. The imaging optical system of the lens apparatus 150 includes the focus lens 151, the zoom lens 152, the diaphragm 153, and the antivibration control lens 154, as described above. The control system of the lens apparatus 150 includes the lens control circuit 160, a focus control circuit 155, a zoom control circuit 156, an aperture control circuit 157, an antivibration control circuit 159, and a lens operation member 161. The lens apparatus 150 further includes an angular velocity detection circuit 158, a memory 162, and the I/F 170.

The focus lens 151 changes a focal position in the imaging optical system by moving in an optical axis direction. The zoom lens 152 changes a focal length in the imaging optical system by moving in the optical axis direction. The diaphragm 153 includes an aperture diameter (aperture value) changing mechanism and changes the amount of light incident on the image capturing apparatus 100 by changing an aperture diameter. The antivibration control lens 154 reduces an image blur caused by a camera shake, caused by, for example, a movement of a hand holding a camera (hereinafter, "hand shake"), by moving in a direction orthogonal to the optical axis direction.

The focus control circuit 155 drives the focus lens 151 under the control of the lens control circuit 160 or based on a user instruction input via the lens operation member 161. The focus control circuit 155 outputs focus information, such as the position of the focus lens 151, to the lens control circuit 160.

The zoom control circuit 156 drives the zoom lens 152 under the control of the lens control circuit 160 or based on a user instruction input via the lens operation member 161. The zoom control circuit 156 outputs zoom information, such as the focal length, to the lens control circuit 160.

The aperture control circuit 157 drives the diaphragm 153 under the control of the lens control circuit 160 or based on a user instruction input via the lens operation member 161. The aperture control circuit 157 outputs aperture information, such as the aperture value, to the lens control circuit 160.

The angular velocity detection circuit 158 detects, under the control of the lens control circuit 160, an angular velocity (angular velocity in yaw and pitch directions) at the time of a move of the lens apparatus 150 by a hand shake, panning, or tilting, and outputs the detected angular velocity to the lens control circuit 160.

The antivibration control circuit 159 drives the antivibration control lens 154 under the control of the lens control circuit 160. The antivibration control circuit 159 outputs antivibration information, such as an antivibration-possible range, to the lens control circuit 160.

The lens control circuit 160 controls the focus control circuit 155, the zoom control circuit 156, the aperture control circuit 157, the angular velocity detection circuit 158, and the antivibration control circuit 159 based on a user instruction provided via the lens operation member 161 or a command from the image capturing apparatus 100 via the I/F 170. For example, if a lens information acquisition command is transmitted from the image capturing apparatus 100, the lens control circuit 160 transmits information acquired from the control circuits or the detection circuit to the image capturing apparatus 100 via the I/F 170. The lens control circuit 160 computes, based on the focus information and the zoom information, a possible maximum focal length within a drivable range of the focus lens 151 and a focal length change rate at the current position of the focus lens 151. The lens control circuit 160 transmits, for example, information about the computation results of the maximum focal length and the focal length change rate, as a response to a request from the image capturing apparatus 100, to the image capturing apparatus 100 via the I/F 170.

The lens operation member 161 includes, for example, a focus operation ring, a zoom operation ring, an auto-focus/manual-focus (AF/MF) switch, and an image stabilizer (IS) (antivibration) on/off switch, and if a user operates any of them, operation information is output as a user instruction to the lens control circuit 160. The lens control circuit 160 at this time transmits the user operation information input from the lens operation member 161 to the image capturing apparatus 100 via the I/F 170. In this case, the system control circuit 130 of the image capturing apparatus 100 changes an operation mode for various functions of the lens apparatus 150 based on the user operation information received via the I/F 120.

The memory 162 is an internal memory of the lens apparatus 150 and stores information for use in the control by the control system and individual pieces of information about each lens apparatus. The individual pieces of information about each lens apparatus includes various information, and examples thereof include various optical characteristics information about the lens apparatus 150. The various optical characteristics information includes image magnification change characteristics information and distortion characteristics information in the lens apparatus 150.

If the lens apparatus 150 is attached to the lens mount 180, the I/F 170 connects to the I/F 120 of the image capturing apparatus 100 via the connector 190. Then, the I/F 170 performs communication using an electric signal between the system control circuit 130 of the image capturing apparatus 100 and the lens control circuit 160 of the lens apparatus 150 via the connector 190 and the I/F 120.

<Description of Configuration and Process for Distortion Aberration Correction>

The image capturing apparatus 100 according to the present exemplary embodiment is capable of generating an image with distortion being corrected, using first information about a correction value for correcting a distortion arising from the lens apparatus 150 and second information for reducing a change in an angle of view caused by a correction of a distortion.

Figure 2:
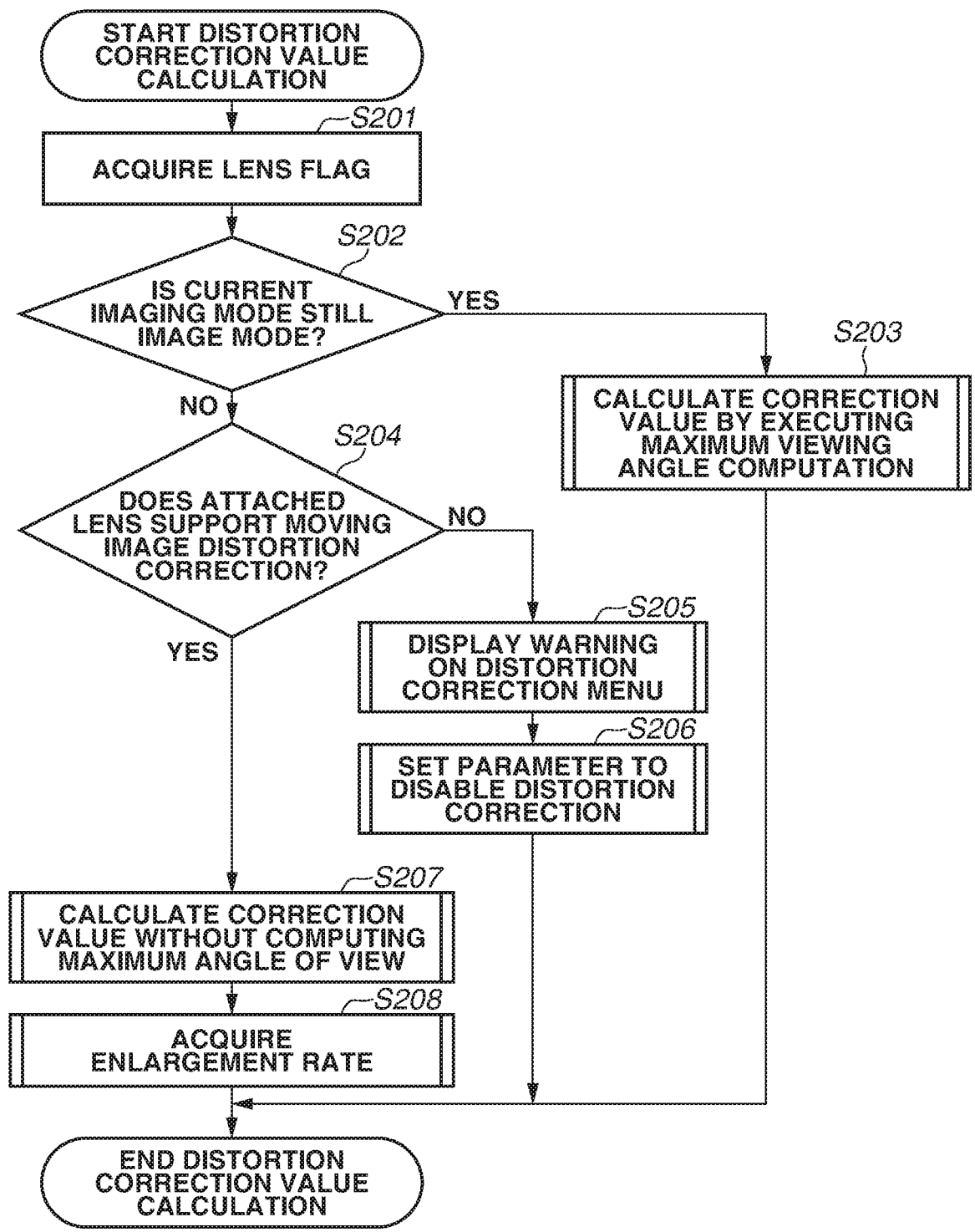
FIG. 2 is a flowchart illustrating a process of calculating a correction value according to a first exemplary embodiment.

FIG. 2 is a flowchart illustrating a distortion correction value calculation process with which the image capturing apparatus 100 according to the present exemplary embodiment realizes a correction of a distortion while suppressing a change in angle of view when the focal position is changed (when the focus changes).

Prior to the description of the flowchart illustrated in FIG. 2, typical distortion correction processing and a situation thereof will be described below with reference to FIGS. 3 to 6 in order to facilitate understanding of the distortion correction according to the present exemplary embodiment.

Figure 3:
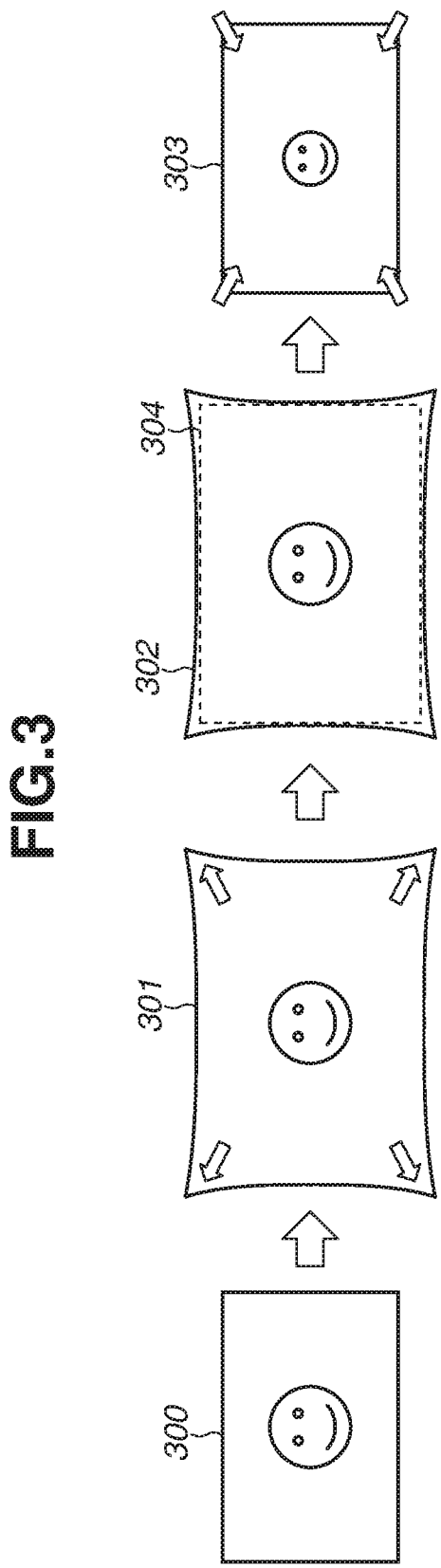
FIG. 3 illustrates correction for a barrel distortion.

FIG. 3 illustrates a process of correcting a typical barrel distortion. In FIG. 3, an image 300 illustrates an example of an image before barrel distortion correction. In the example illustrated in FIG. 3, only a face is displayed as a subject, so that an effect of a barrel distortion originating from the lens is difficult to recognize. However, in a case where, for example, a subject including a straight line is in an image, the straight line portion appears distorted in an image before distortion correction. An image 301 illustrates an image after a barrel distortion correction based on lens characteristics is performed on the image 300. Since a barrel distortion is an aberration that causes a distortion in which portions in diagonal directions shrink, the barrel distortion correction is performed such that the image is expanded in the diagonal direction. In general, an amount of distortion is likely to increase as a distance from an axis (hereinafter, "image height") becomes greater, so that the image 301 after the barrel distortion correction becomes such an image with the four corners are pulled especially in the diagonal directions, i.e., an image expanded in the directions of the four corners. The subject in the image 301 after the aberration correction becomes in a state in which the distortion caused by the barrel distortion of the lens is corrected. Meanwhile, a final output image is to be a rectangular image, such as a square or rectangle, so that the image 301 after the distortion correction is processed such that an image 302 is obtained with the widest possible angle of view (hereinafter, the processing will be referred to as "maximum angle of view computation processing"). Since the number of output pixels in a typical image capturing apparatus 100 is expected to be a predetermined fixed value, a rectangular image 304 is cut from the image acquired through the maximum angle-of-view computation processing and is further processed to be adjusted to the number of output pixels (e.g., the same number of pixels as the image 300) of the image capturing apparatus. More specifically, a final output image 303 is an image acquired by shrinking, to the same size as the original image 300, the rectangular image 304 cut from the image that is expanded in the directions of the four corners by barrel distortion correction and on which maximum angle of view computation processing is executed. The above-described series of processing is performed to thereby generate an image with a barrel distortion being corrected while a defect in angle of view is suppressed.

Figure 4:
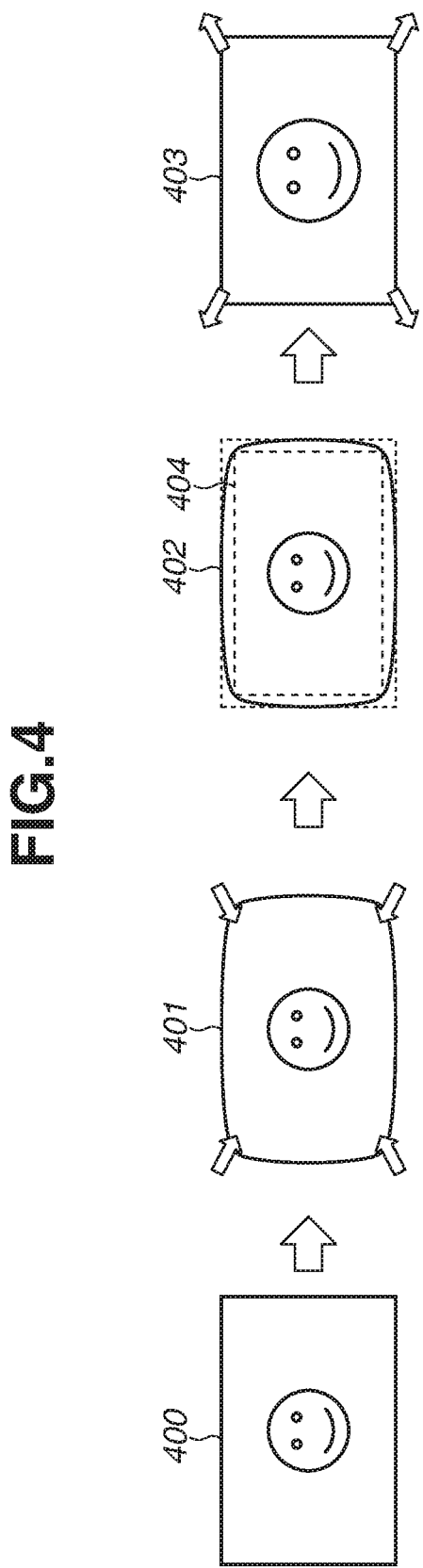
FIG. 4 illustrates correction for a pincushion distortion.

Next, a process of correcting a typical pincushion distortion will be described below with reference to FIG. 4. In FIG. 4, an image 400 illustrates an example of an image before pincushion distortion correction. In the example illustrated in FIG. 4, only a face is displayed as a subject, so that an effect of a pincushion distortion arising from the lens is difficult to recognize, as in FIG. 3. However, in a case of a subject containing a straight line, the straight line portion appears distorted in an image before distortion correction. An image 401 illustrates an image after a pincushion distortion correction based on lens characteristics is performed on the image 400. Since a pincushion distortion is an aberration that causes a distortion in which portions in diagonal directions are expanded, the pincushion distortion correction is performed such that the image in the diagonal directions shrinks. Further, an amount of distortion is likely to increase as the image height becomes greater also in the case of the pincushion distortion, so that the image 401 after the pincushion distortion correction becomes such an image with the four corners shrunk especially in the diagonal directions. The subject in the image 401 after the aberration correction becomes in a state in which the distortion caused by the pincushion distortion is corrected. As in the cases described above, in the case of performing pincushion aberration correction, a final output image is to be a rectangular image, such as a rectangle, so that the image 401 after the aberration correction undergoes maximum angle-of-view computation processing such that an image 402 is obtained with the widest possible angle of view. A rectangular image 404 is then cut from the image acquired after the maximum angle-of-view computation processing is performed, and is processed to be adjusted to the number of output pixels (the same size as the image 400) of the image capturing apparatus 100. More specifically, a final output image 403 is an image acquired by enlarging, to the same size as the original image 400, the rectangular image 404 cut from the image that is shrunk in the directions of the four corners by pincushion distortion correction and on which maximum angle of view computation processing is executed. The above-described series of processing is performed to thereby generate an image with a pincushion distortion being corrected while a defect in angle of view is reduced.

While a typical distortion correction method is described above, in a case of imaging, for example, a moving image, if distortion correction is performed on the moving image, the size of a subject that appears at a screen center may be changed depending on the amount of correction of distortion. In the distortion correction methods described above with reference to FIGS. 3 and 4, the rectangular image cut from the image acquired as a result of maximum angle of view computation processing is enlarged (in the case of FIG. 3) or shrunk (in the case of FIG. 4) based on the amount of correction of distortion in generating the final output image by cutting the rectangular image. Thus, if the in-focus position is moved while the moving image is imaged, the amount of distortion changes according to the moved in-focus position, and the amount of correction for the correction changes. In other words, moving only the in-focus position during the imaging of a moving image changes the enlargement rate or shrinking rate at the time of acquiring a final output image, and consequently a low-quality moving image in which the size of a subject at a screen center changes may be obtained.

Figure 5:
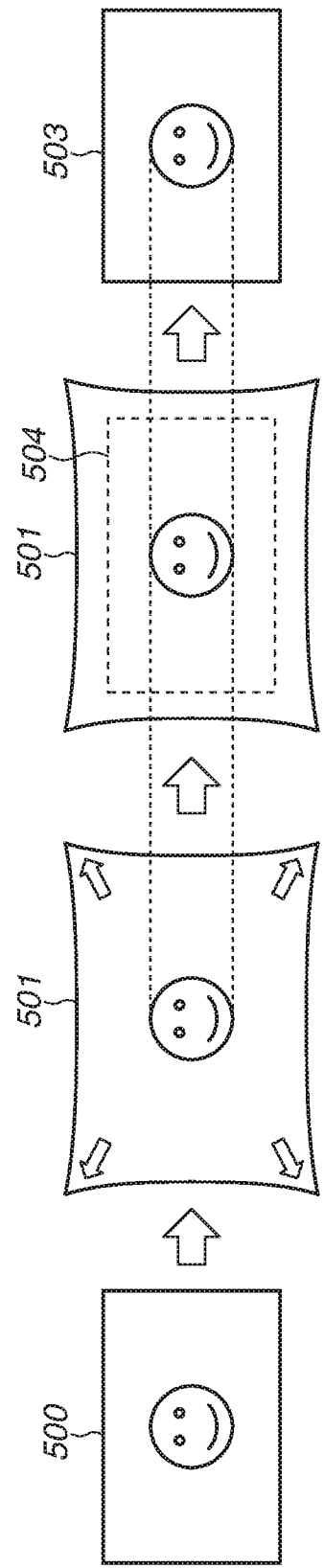
FIG. 5 illustrates correction for a barrel distortion in a moving image.

An example of a possible method for addressing these is not performing the above-described maximum angle-of-view computation processing. This method will be described below with reference to FIG. 5. FIG. 5 illustrates an example in the case in which barrel distortion correction processing is performed. In FIG. 5, an image 500 is an example of an image before barrel distortion correction, similar to the image 300 in FIG. 3, whereas an image 501 is an example of an image after barrel distortion correction, similar to the image 301 in FIG. 3. In this example, a rectangular image 504 having the same size as the original image 500 is cut out from the image 501 after barrel distortion correction with the above-described maximum angle-of-view computation processing not being performed, and the clipped rectangular image 504 is output as a final output image 503. In other words, the output image 503 is an image acquired with resizing processing to shrink the rectangular image 504 as described above not being performed. This processing enables an image to be output without changing the size of a subject at a center of the image. Thus, even if, for example, the in-focus position changes during the imaging of a moving image and the amount of distortion is changed, distortion correction is performed while the scale of an image in a central portion of a subject is prevented from changing.

Figure 6:
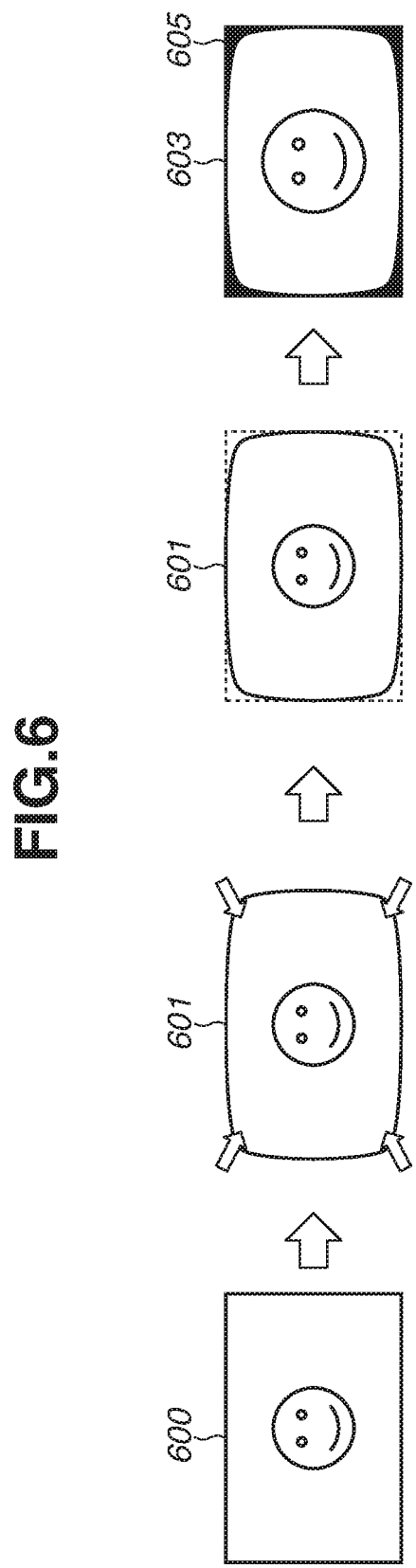
FIG. 6 illustrates correction of a pincushion distortion in a moving image.

This method however may cause an issue described below in the case of correcting a pincushion distortion. This will be described below with reference to FIG. 6. In FIG. 6, an image 600 is an example of an image before pincushion distortion correction, similar to the image 400 in FIG. 4, whereas an image 601 is an example of an image after pincushion distortion correction, similar to the image 401 in FIG. 4. Assume that a rectangular image having the same size as the original image 400 is cut out from the image 401 after pincushion distortion correction with the above-described maximum angle-of-view computation processing not being performed. In the pincushion distortion correction, however, the processing to shrink an image in diagonal directions of four corners is performed as described above, so that a rectangular image 603 to be cut out in the same size as the original image 400 results in an image including a blank region 605, an image with each corner including no image. Thus, in the case of performing pincushion distortion correction, the above-described maximum angle-of-view computation processing is to be performed, and thus if, for example, the in-focus position changes during the imaging of a moving image, there remains an issue that a low-quality moving image is obtained in which the scale of a central portion of the image changes depending on distortion characteristics at the in-focus position.

To address this, the image capturing apparatus 100 according to the present exemplary embodiment performs the distortion correction value calculation process illustrated in the flowchart in FIG. 2 to thereby realize distortion correction while suppressing a change in angle of view when a focal position changes (when a focus changes). The process illustrated in the flowchart in FIG. 2 is executed by the system control circuit 130 of the image capturing apparatus 100. The process illustrated in the flowchart can be realized by a hardware configuration or a software configuration based on a program that is executed by a central processing unit (CPU), or part of the process can be realized by a hardware configuration while the remaining part is realized by a software configuration. The program that is executed by the CPU can be stored in, for example, a non-volatile memory, such as the recording circuit 108, or can be acquired from an external memory or via a network (not illustrated). The same applies to other flowcharts described later.

In step S201, the lens communication control circuit 133 of the system control circuit 130 acquires a flag of feature information in the distortion correction of the lens attached to the lens mount 180 from the lens apparatus 150 via the I/F 170. As used herein, the term "flag" refers to information based on which whether the attached lens apparatus 150 is a lens that supports the moving image distortion correction is judged. Since the distortion correction involves angle-of-view transformation, an image that chronologically changes, such as a moving image, is to be corrected so that consecutive frame images are smoothly connected. Meanwhile, some lens apparatuses may have a focus control value and a zoom control value which are not sufficiently accurate. In the case of such a lens apparatus, if distortion correction is performed on frames of a captured moving image, the amount of correction changes rapidly at the time of switching the zoom control value or the focus control value, and the angle of view of the moving image changes rapidly, as described above, so that the quality of the moving image decreases. Thus, the flag is to be added only for the lens apparatus 150 that has zoom/focus control values which are accurate enough to perform distortion correction even at the time of imaging a moving image. In one embodiment, the flag is recorded in advance in the memory 162 of the lens apparatus 150 or in distortion correction data described below.

Next, in step S202, the aberration correction control circuit 132 of the system control circuit 130 determines whether the current imaging mode is a moving image mode or still image mode. In the case of a still image, a minor chronological change in angle of view is not likely to bother the user so much. Thus, if the aberration correction control circuit 132 determines that the current imaging mode is the still image mode (YES in step S202), the processing proceeds to step S203, and the aberration correction control circuit 132 computes the maximum angle of view as described above with reference to FIG. 3. However, in a case of obtaining still images through continuous imaging, it is in some cases desirable to reduce a change in angle of view even in the still image mode. Thus, if it is desired to reduce a change in angle of view in the case of continuously imaging still images, the aberration correction control circuit 132 can determine that the current imaging mode is the moving image mode. In step S202, if the aberration correction control circuit 132 determines that the current imaging mode is the moving image mode (NO in step S202), the processing proceeds to step S204.

Figure 15:
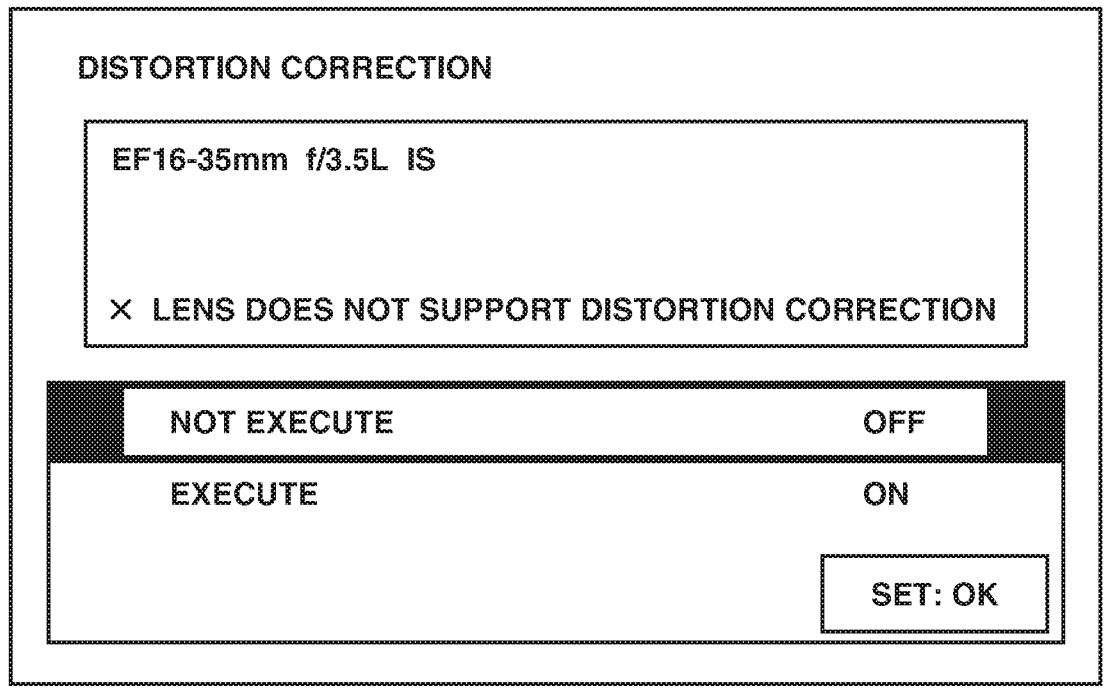
FIG. 15 illustrates an example of a display of a distortion correction menu.

In step S204, the aberration correction control circuit 132 determines whether the attached lens apparatus 150 supports the moving image distortion correction. The determination in step S204 is performed based on the flag information acquired in step S201. If the distortion correction is applied to a moving image captured using the lens apparatus 150 that does not support the moving image distortion correction, the quality of the moving image may not be assured as described above, so that a notification thereof is to be provided to the user. Thus, if the aberration correction control circuit 132 determines that the lens apparatus 150 does not support the moving image distortion correction (NO in step S204), the processing proceeds to step S205, and a notification that the quality of the moving image may not be assured is provided to the user by, for example, displaying a warning on the image display apparatus 106. Examples of a method for user notification include a method in which an icon indicating that the distortion correction is not applied is displayed on the image display apparatus 106 and a method in which the distortion correction menu is set unselectable as illustrated in FIG. 15. FIG. 15 illustrates an example of a distortion correction menu displayed on the screen of the image display apparatus 106, and the menu items "execute (ON)" and "not execute (OFF)" distortion correction, which are normally selectable, are set unselectable. In the next step S206, the aberration correction control circuit 132 sets a parameter to forcibly disable the distortion correction.

Even for the lens supporting the moving image distortion correction, if the maximum angle-of-view computation processing is performed as described above, the angle of view changes based on the focus position at the time of a change in focus, so that the distortion correction value is to be calculated with the maximum angle of view not being computed. Thus, in step S204, if the aberration correction control circuit 132 determines that the lens apparatus 150 is a lens that supports the moving image distortion correction (YES in step S204), then in step S207, the aberration correction control circuit 132 calculates the distortion correction value with the maximum angle of view not being computed. In the case of omitting the computation of the maximum angle of view, as described above, if pincushion distortion correction is performed, the number of pixels becomes less than the original size, and a blank region is formed at a peripheral portion.

Thus, if the lens apparatus 150 is a lens that causes a pincushion distortion, then in step S208, the aberration correction control circuit 132 instructs the image processing circuit 140 to perform enlargement processing and controls so as to prevent a blank region from being formed in a peripheral portion. In other words, the image processing circuit 140 performs enlargement processing, thus moving a blank region containing no image to the outside of the above-described rectangular image. In this way, a rectangular image is acquired that has the same size as the original image and contains an image in a peripheral portion as well. The enlargement rate in the enlargement processing by the image processing circuit 140 can be set as a uniform enlargement rate or can be stored in advance in the memory 162 of the lens apparatus 150.

There may be cases in which substantially no pincushion distortion occurs, depending on a condition, such as a focal length, so that if a uniform enlargement rate is set, enlargement processing is uniformly performed even in the cases in which substantially no pincushion distortion occurs, which may degrade the image quality. To address this, for example, the enlargement rate is changed for each focal length using the data illustrated in FIGS. 7A and 7B and the flowchart illustrated in FIG. 8, thus suppressing degradation in quality caused by the enlargement processing.

Figures 7A, 7B:
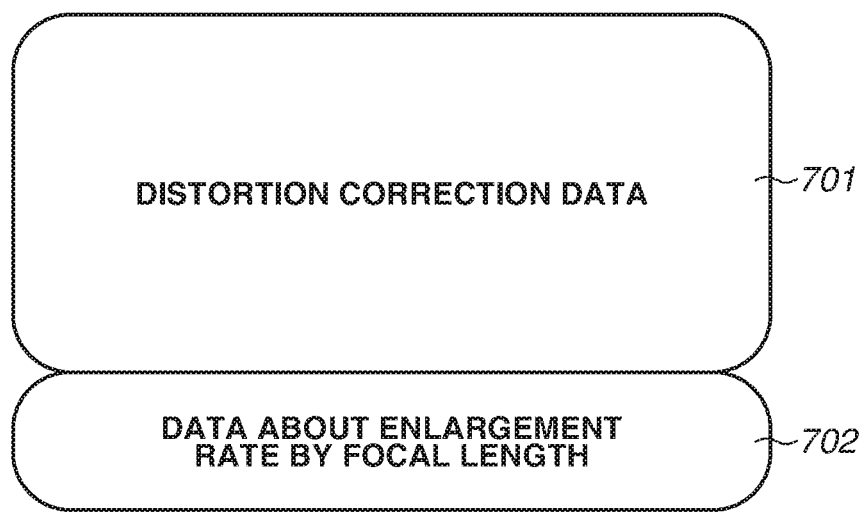
FIGS. 7A and 7B illustrate an example of a data format according to the first exemplary embodiment.

FIG. 7A illustrates an example of a data format for holding an enlargement rate by focal length in advance. In FIG. 7A, a memory region 701 is a region for storing distortion correction data. The distortion correction data in the memory region 701 is commonly used for moving and still images, so that optical characteristics information about the lens apparatus 150 is stored without change. Specifically, the distortion correction data is prepared and stored in advance for each combination of the values of focal length, in-focus position, and image height. If at least one of the focal length and the in-focus position is changed, the distortion correction data for use in correction is changed. A memory region 702 is a region in which enlargement rate information acquired in step S208 is stored as a table.

FIG. 7B illustrates an example of the table stored in the memory region 702 and specifies a correspondence relationship between possible focal lengths of the lens apparatus 150 and the value of an enlargement rate corresponding to the respective focal length. In the table illustrated in FIG. 7B, the values of enlargement rates that correspond to focal lengths Z01 to Z07 and are used in the pincushion distortion correction are recorded. In the case of the example illustrated in FIG. 7B, the enlargement rates corresponding to the focal lengths Z01 to Z03 are each set to one. This indicates that regions of the focal lengths Z01 to Z03 do not need to be enlarged because the regions contain substantially no pincushion distortion. On the other hand, the enlargement rates corresponding to the focal lengths Z04 to Z07 are set so as to increase gradually in this order. This indicates that the amount of pincushion aberration gradually increases in the regions of the focal lengths Z04 to Z07 in this order. As described above, the amount of pincushion aberration is changed even by the in-focus position being moved, but the table illustrated in FIG. 7B does not correspond to the in-focus positions and corresponds only to the focal lengths. This is because the enlargement rates recorded in the table with respect to the focal lengths Z04 to Z07 are each set based on the in-focus position at the time at which the amount of pincushion aberration reaches the largest amount at the corresponding focal length. Thus, the image after distortion correction is enlarged according to the enlargement rate recorded in the table so that the blank region 605 illustrated in FIG. 6 is not formed regardless of where the in-focus position is set.

Alternatively, in place of the table illustrated in FIG. 7B, a table in which an enlargement rate corresponding to a combination of focal length and in-focus position is recorded may be prepared, and the image capturing apparatus 100 having received the table data may select an enlargement rate that is the maximum for each focal length.

As illustrated in FIG. 7B, the enlargement rate is variable according to the focal length, and a change in the enlargement rate is generally much smaller than a change in the angle of view due to a change in the focal length. Thus the enlargement rate is buried in the change in the angle of view due to the change in the focal length change, so that a change in the enlargement rate at the time of changing the focal length presents no issue. The table data in FIG. 7B is recorded in the memory 162 of the lens apparatus 150. The table data can be transferred to the memory 107 of the image capturing apparatus 100 as needed and used.

Figure 8:
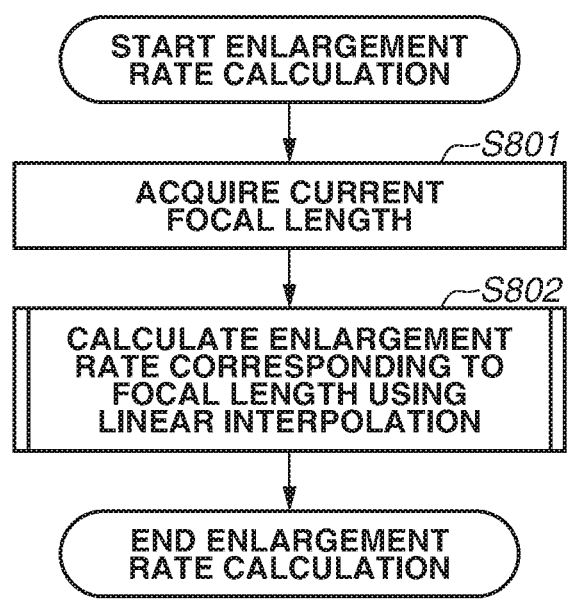
FIG. 8 is a flowchart illustrating a process of calculating an enlargement rate according to the first exemplary embodiment.

FIG. 8 is a flowchart illustrating a process through which the aberration correction control circuit 132 of the image capturing apparatus 100 calculates the enlargement rate using the table illustrated in FIG. 7B.

In step S801, the aberration correction control circuit 132 acquires, via the lens communication control circuit 133, current focal length information transmitted from the lens apparatus 150.

Next, in step S802, the aberration correction control circuit 132 refers to the enlargement rate corresponding to the focal length acquired in step S801 using the table in the memory region 702 described above with reference to FIGS. 7A and 7B. If data about the enlargement rate is prepared not for every possible focal length of the lens apparatus 150 and is recorded as thinned data by focal length, the aberration correction control circuit 132 calculates an enlargement rate corresponding to a focal length by, for example, linear interpolation.

The aberration correction control circuit 132 then controls the image processing circuit 140 in such a manner that distortion correction and enlargement processing are performed based on the enlargement rate acquired as described above and the distortion correction data in the memory region 701 in FIG. 7A.

In this way, the image capturing apparatus 100 according to the present exemplary embodiment enables a distortion to be corrected while suppressing a change in angle of view caused by a change in focus during the imaging of a moving image.

A second exemplary embodiment will be described below. A configuration according to the second exemplary embodiment is similar to that in FIG. 1, so that illustration thereof is omitted. In the second exemplary embodiment, a table that specifies a correspondence between a focal length and a shift amount of an amount of distortion correction is used in place of the table that specifies the correspondence between the focal length and the enlargement rate as described above with reference to FIG. 7B.

Figure 10:
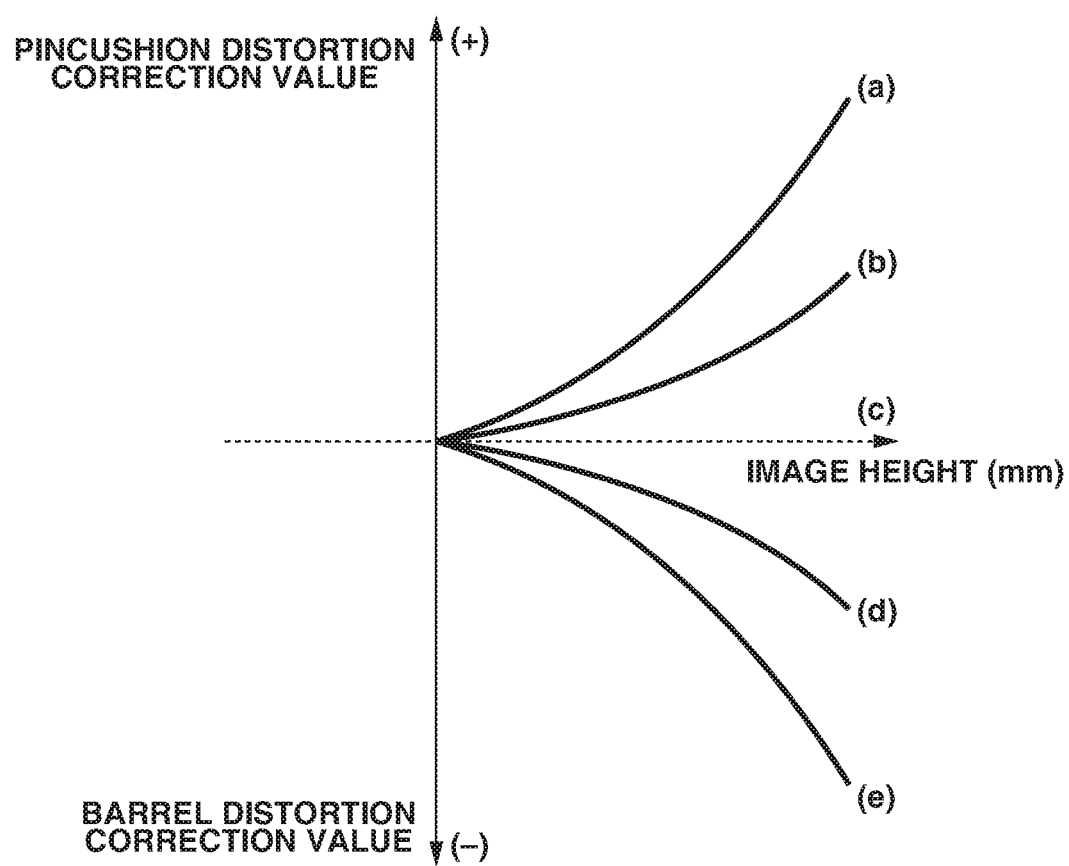
FIG. 10 illustrates a distortion characteristic.
Figure 11:
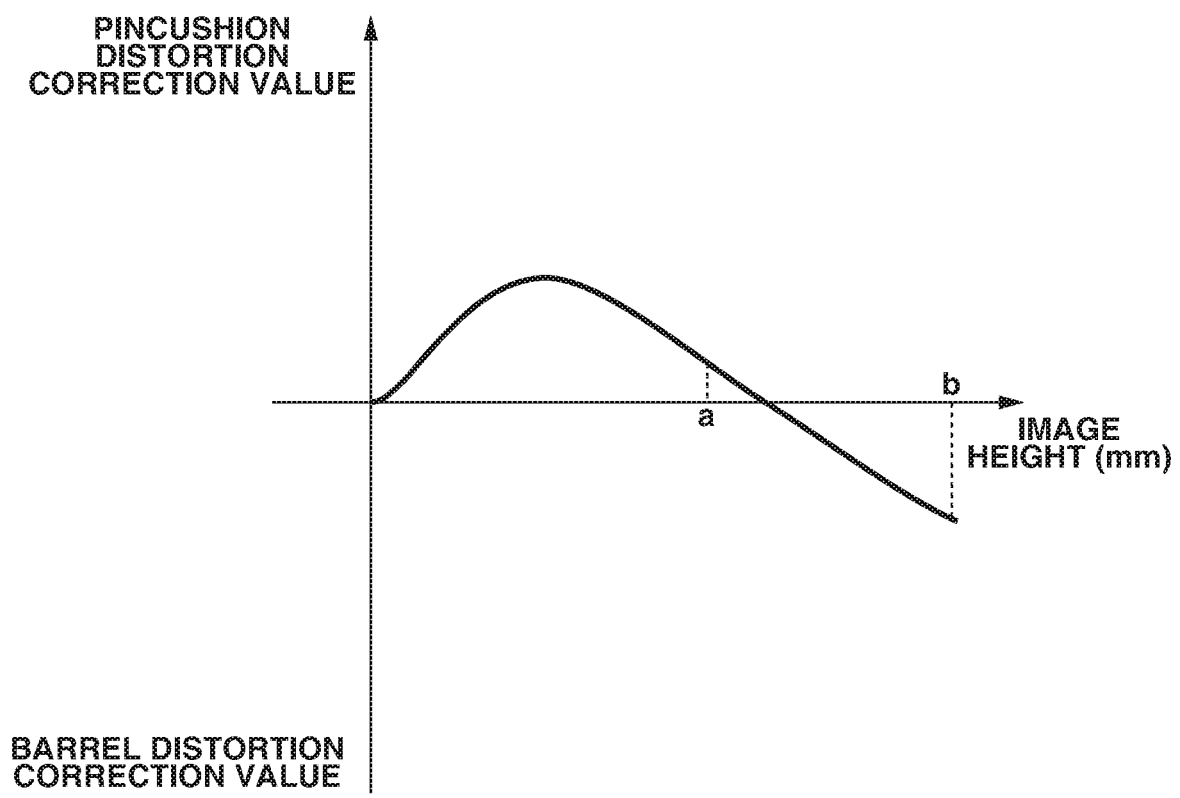
FIG. 11 illustrates a feature of distortion correction according to the second exemplary embodiment.

An issue that can arise in the case of using the enlargement rate corresponding to the focal length as described above in the first exemplary embodiment will be described below with reference to FIGS. 9 to 11. An example of the issue that can arise in the case of using the enlargement rate is that each moving image mode requires a different amount of enlargement. More specifically, a reading region of the image sensor 102 may become variable depending on the moving image mode of the image capturing apparatus 100, and the issue may arise in this case.

Figure 9:
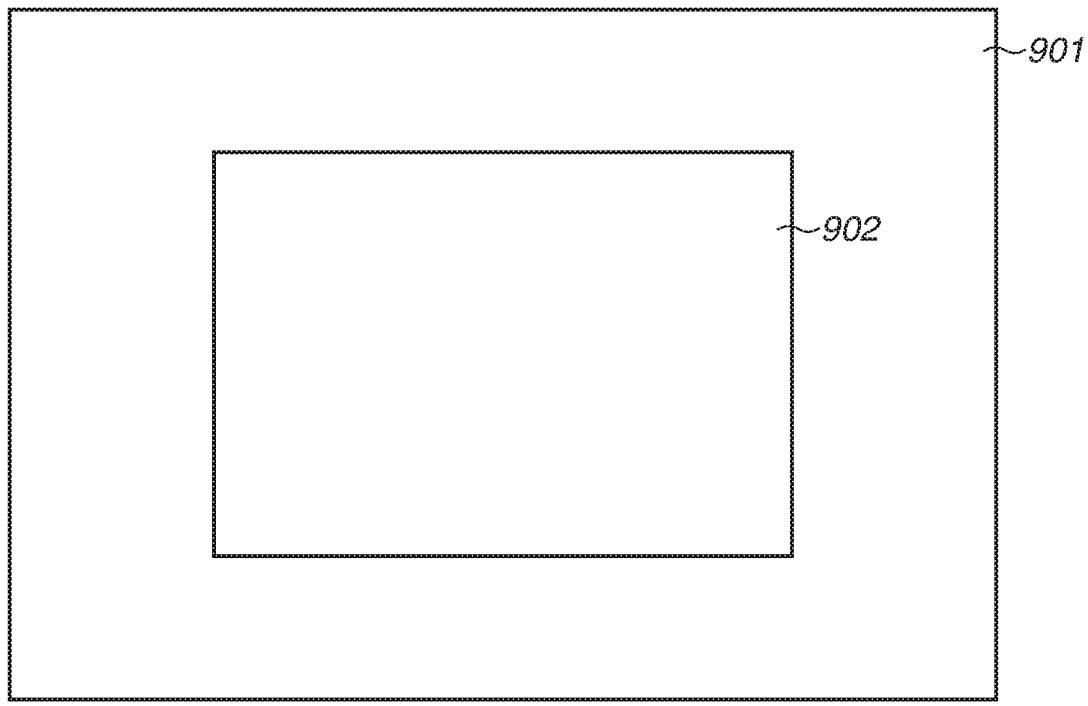
FIG. 9 illustrates an image capturing region in a moving image mode according to a second exemplary embodiment.

For example, a region 901 in FIG. 9 indicates an image capturable region of the image sensor 102. The image capturing apparatus that includes both the still image mode and the moving image mode is basically designed in such a manner that a region for the still image mode becomes the region 901 of the image sensor. In the case of capturing a moving image with the image capturing apparatus, although it is desirable to generate a moving image from data read from a region similar to that for the still image mode, since at least 30 frames are to be read per second at the time of generating a moving image, generating such a moving image is often difficult in terms of processing capacity. Thus, in general, the number of pixels is reduced by performing, for example, horizontal/vertical thinning or addition on the region 901, and a moving image is generated to thereby reduce the processing load in the moving image mode of the image capturing apparatus. The moving image on which thinning or addition is performed may suffer various degradation in image quality, such as moire and a drop in the sense of resolution, depending on the amount of thinning or addition. Thus, a mode is prepared as a moving image mode of the image capturing apparatus, in which a region to be read from the image sensor 102 is limited as specified by a region 902 in FIG. 9 and a moving image is generated without performing thinning or addition (the mode will be referred to as "crop reading mode"). In the crop reading mode, the region to be read from the image sensor 102 is limited so that the processing load is reduced and, since thinning and addition are not performed, a degradation in image quality such as moire and a drop in the sense of resolution is reduced.

However, there is a case in which the image capturing region in the image sensor 102 in the crop reading mode is different from those in the other modes. This will be described below with reference to FIGS. 10 and 11.

First, general distortion correction data will be described below with reference to FIG. 10. FIG. 10 is a graph illustrating a relationship between an image height and a distortion correction value. In FIG. 10, the positive direction of the vertical axis represents the pincushion distortion correction value, and a larger numerical value of the pincushion distortion correction value indicates that a larger amount of pincushion distortion is to be corrected. The negative direction of the vertical axis represents the barrel distortion correction value, and a smaller numerical value of the barrel distortion correction value indicates that a larger amount of barrel distortion is to be corrected. In other words, in the distortion correction in FIG. 10, the correction value that is a positive numerical value indicates that the image is to be corrected so as to be shrunk in the diagonal directions, whereas the correction value that is a negative numerical value indicates that the image is to be corrected so as to be expanded in the diagonal directions.

Next, a shape of distortion correction that can be considered as an issue in the above-described first exemplary embodiment will be described below with reference to FIG. 11. In FIG. 11, as in FIG. 10, the positive direction of the vertical axis represents the pincushion distortion correction value, whereas the negative direction of the vertical axis represents the barrel distortion correction value. In the case of the correction values specified as an example in FIG. 11, correction for pincushion distortion correction is indicated for a low image height, whereas correction for barrel distortion correction is indicated for a high image height. In FIG. 11, an image height a specifies the maximum image height of the region 902 in FIG. 9, whereas an image height b specifies the maximum image height of the region 901 (image capturable region) in FIG. 9.

In the above-described first exemplary embodiment, the enlargement rate in the case of performing distortion correction on the region 901 in FIG. 9 is stored in the memory region 702 in FIG. 7A as the enlargement rate in the pincushion distortion correction. Thus, for example, in a case where distortion correction is performed in the crop reading mode using the region 902 in FIG. 9, an amount of enlargement is larger than the region 901, so that an enlargement rate for the region 901 is insufficient and an image containing a blank region may be output. In the case where the data about the memory regions 701 and 702 in FIG. 7A is stored in the memory 162 of the lens apparatus 150, it is difficult to store the data as data prepared for every moving image mode of various types of image capturing apparatuses 100 to which the lens apparatus 150 is attached. Thus, there are cases in which a high-quality image cannot be generated after the distortion correction in the image capturing apparatus 100 using the data stored in the memory 162 of the lens apparatus 150.

Figure 12:
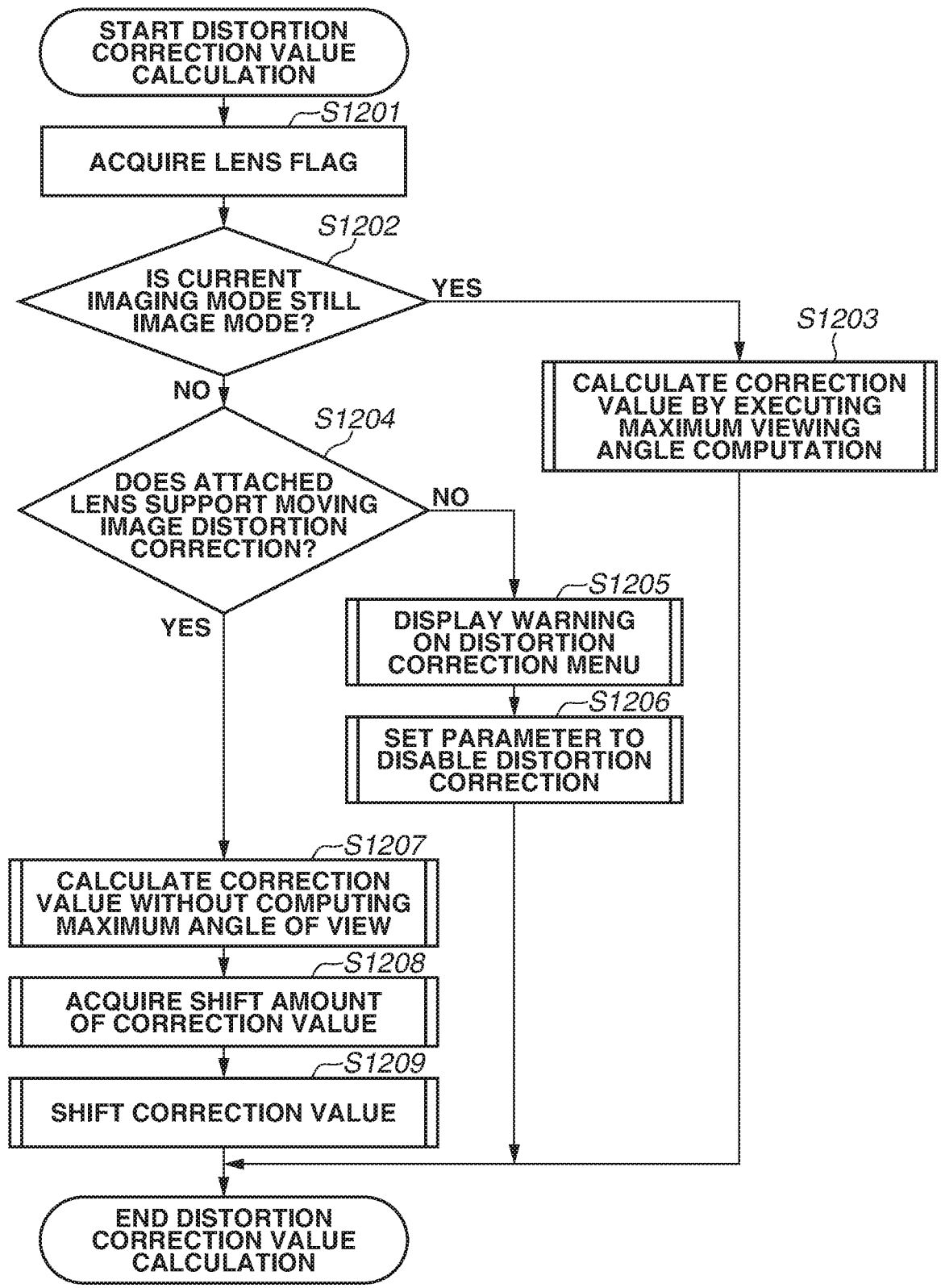
FIG. 12 is a flowchart illustrating a process of calculating a correction value according to the second exemplary embodiment.

Thus, the image capturing apparatus 100 according to the second exemplary embodiment performs distortion correction value calculation processing illustrated in a flowchart in FIG. 12. Processes in steps S1201 to S1207 in the flowchart in FIG. 12 are similar to those in steps S201 to S207 in FIG. 2, so that description thereof is omitted. The second exemplary embodiment is different from the first exemplary embodiment in that a shift amount of the distortion correction value is calculated instead of calculating the enlargement rate in the first exemplary embodiment.

Figure 13A:
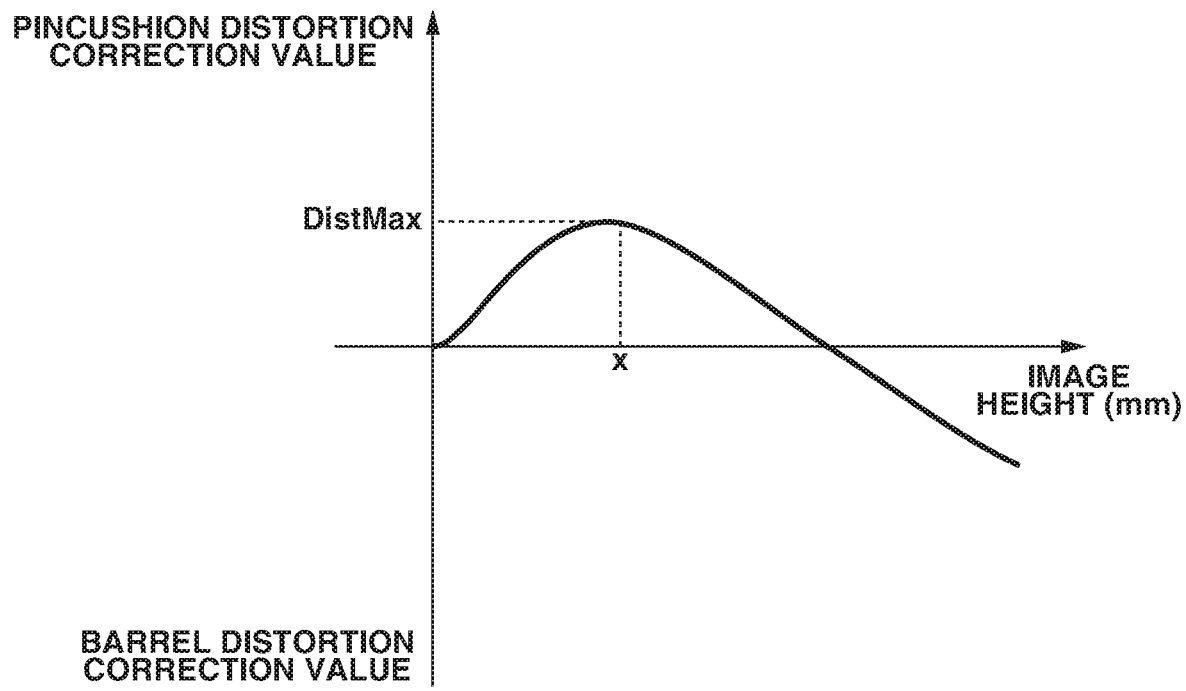
FIGS. 13A and 13B illustrate a shift amount of a distortion according to the second exemplary embodiment.

The shift amount of the distortion correction value will be described below with reference to FIG. 13A. FIG. 13A is a graph illustrating a characteristic of distortion correction, where an issue arises in the case of the first exemplary embodiment, as described above with reference to FIG. 11. In the characteristic illustrated in FIG. 13A, an image height x is an image height at which the amount of pincushion distortion becomes maximum, and a correction value DistMax is a correction value corresponding to the image height x. The shift amount for the correction value according to the second exemplary embodiment is indicated by the correction value DistMax.

In step S1207 in FIG. 12, the distortion correction value is calculated with the maximum angle of view not being computed, and then in step S1208, the aberration correction control circuit 132 acquires the shift amount of the distortion correction value from the lens apparatus 150 via the lens communication control circuit 133.

Figure 13B:
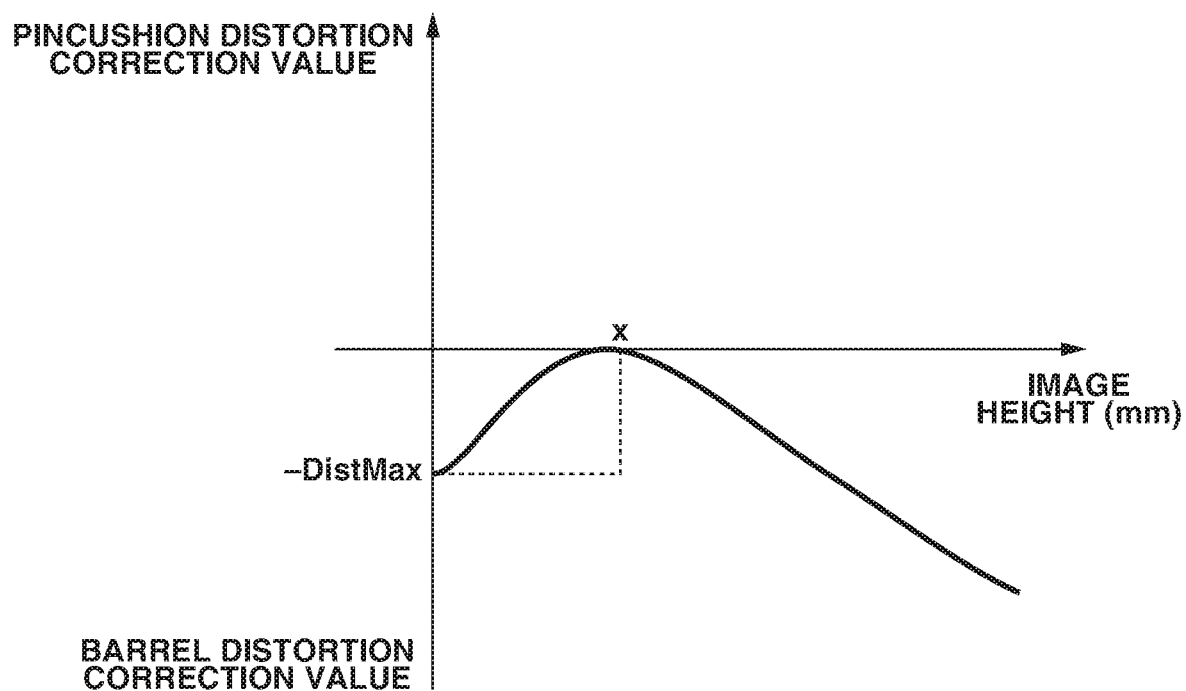

In the next step S1209, the aberration correction control circuit 132 shifts the distortion correction value by the shift amount acquired in step S1208. This will be described below with reference to FIG. 13B. As illustrated in FIG. 13B, the aberration correction control circuit 132 shifts the distortion correction value by the shift amount specified in FIG. 13A to thereby transform the value into a parameter with which virtually no pincushion distortion correction is needed, i.e., enlargement after distortion correction is unnecessary. FIG. 13A illustrates a characteristic of aberration correction in a case where a subject image at the image height of zero, i.e., origin, is determined as a reference point that is not to be moved, whereas FIG. 13B illustrates a characteristic of aberration correction in a case where a subject image at the position of the image height x is determined as a reference point that is not to be moved.

Next, a method for holding data about the shift amount for the correction value by focal length according to the second exemplary embodiment will be described below with reference to FIGS. 14A and 14B.

Figures 14A, 14B:
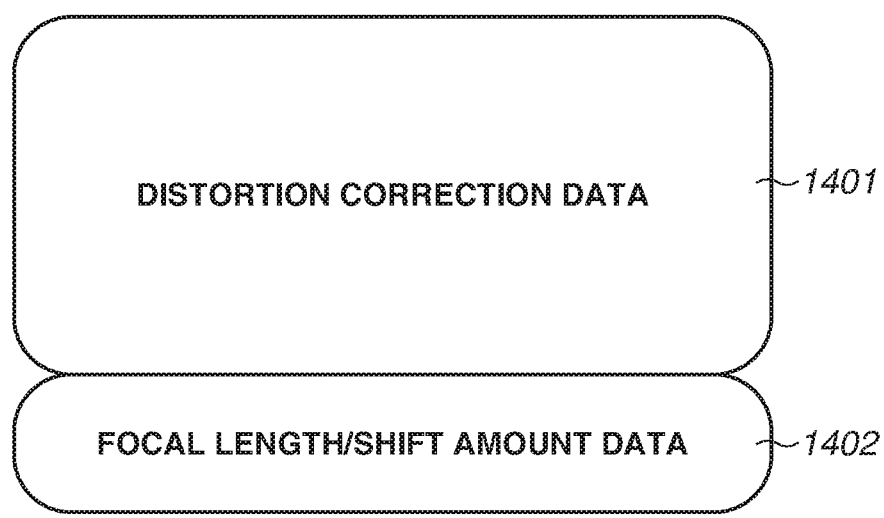
FIGS. 14A and 14B illustrate an example of a data format according to the second exemplary embodiment.

FIG. 14A illustrates an example of a data format for holding the shift amount for the correction value by focal length. In FIG. 14A, a memory region 1401 is used for storing the distortion correction data. As in the memory region 702 in FIG. 7A, the distortion correction data stored in the memory region 1401 is commonly used for moving and still images, so that optical characteristics information about the lens apparatus 150 is stored with the optical characteristics information not being changed. A memory region 1402 is a region in which information about the shift amount for the correction value that is acquired in step S1408 is stored in a table. As in the case of FIG. 7A, the shift amount for the correction value is stored in association with the distortion correction data in the memory region 1401.

FIG. 14B illustrates an example of the table stored in the memory region 1402 and specifies a correspondence relationship between possible focal lengths of the lens apparatus 150 and the shift amount for the correction value corresponding to the respective focal length. In the table illustrated in FIG. 14B, the maximum value of the shift amount for the correction value in the case of changing the in-focus position from the closest position toward infinity at the focal lengths Z01 to Z07, which are settable in the lens apparatus 150. In the case in which, for example, the distortion characteristic of a target focal length is the barrel aberration, since the above-described issue does not arise and thus the correction value does not need to be shifted, the value "0" is recorded as the value of the shift amount. In other words, FIG. 14B illustrates an example in which the characteristics at the focal lengths Z01 to Z03 are the barrel distortion. On the other hand, the shift amount for the correction value gradually increases from the focal length Z04 to the focal length Z07. Specifically, the value of the shift amount gradually increases in the regions at the focal lengths Z04 to Z07, in this order, to shift the correction value. According to the present exemplary embodiment, the table illustrated in FIG. 14B does not correspond to the in-focus position and corresponds only to the focal length, because the shift amounts recorded in the table with respect to the focal lengths Z04 to Z07 are each set based on the in-focus position at the time at which the amount of pincushion aberration reaches the largest amount at each focal length.

Alternatively, in place of the table illustrated in FIG. 14B, a table in which a shift amount corresponding to a combination of focal length and in-focus position is recorded may be prepared, and the image capturing apparatus 100 having received the table data may select a shift amount that is the maximum for each focal length.

In the case of the second exemplary embodiment, the table data can be recorded in the memory 162 of the lens apparatus 150 and a shift amount may be read at a timing and a notification of the read shift amount may be transmitted to the image capturing apparatus 100, as in the first exemplary embodiment. Alternatively, the table data can be transmitted to the image capturing apparatus 100 when the lens apparatus 150 is attached to the image capturing apparatus 100.

While the example in which the value (parameter) of the shift amount is prepared is described in the second exemplary embodiment, the present exemplary embodiment is not limited to the example. If there is an extra time for computation, the shift amount that is the maximum at the focal length may be calculated each time from the distortion correction data stored in the memory region 1401.

As described above, the second exemplary embodiment also enables a distortion correction, for example, in performing a distortion correction on a moving image, while a change in angle of view is suppressed in a case of a change in focus regardless of the mode of the image capturing apparatus.

Other Exemplary Embodiment

While the digital camera is described as an example of the image capturing apparatus 100 in the above-described exemplary embodiments, an application is not limited to the example, and the disclosure is also applicable to other image capturing apparatuses. For example, the present exemplary embodiment is also applicable to various mobile terminals such as smartphones and tablet terminals provided with a camera function capable of capturing still and moving images and various monitoring cameras, industrial cameras, automobile cameras, and medical cameras.

Other Embodiment

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

This application claims the benefit of Japanese Patent Application No. 2018-112753, filed Jun. 13, 2018, which is hereby incorporated by reference herein in its entirety.

What is claimed is:

1. An apparatus comprising:
   at least one processor; and
   a memory including instructions that, when executed by the processor, cause the at least one processor to:
   acquire first information about a correction value for correcting a distortion of an image acquired by capturing an optical image formed by a lens and second information for correcting a change in an angle of view which is caused by the correction of the distortion; and
   generate an image in which the distortion is corrected using the first information and the second information.

2. The apparatus according to claim 1,
   wherein the first information includes information provided for individual combinations of focal lengths and in-focus positions of the lens, and
   wherein the second information includes information provided for each of the focal lengths of the lens, and the information does not correspond to the in-focus positions of the lens.

3. The apparatus according to claim 2, wherein the information corresponding to each of the focal lengths of the lens includes information based on an in-focus position at which an amount of pincushion aberration becomes maximum at a corresponding one of the focal lengths.

4. The apparatus according to claim 2,
wherein the instructions, when executed by the processor, further cause the at least one processor to:
select, from the first information, information corresponding to a combination of a focal length and an in-focus position of the lens at a time when an image that is a distortion correction target has been captured; and
select, from the second information, information corresponding to the focal length of the lens at the time when the image that is the distortion correction target has been captured.

5. The apparatus according to claim 1,
wherein the first information and the second information are provided for individual combinations of focal lengths and in-focus positions of the lens, and
wherein the instructions, when executed by the processor, further cause the at least one processor to:
select, from the first information, information corresponding to a combination of a focal length and an in-focus position of the lens at a time when an image that is a distortion correction target has been captured; and
select, from the second information, information corresponding to the focal length of the lens at the time when the image that is the distortion correction target has been captured.

6. The apparatus according to claim 5, wherein the instructions, when executed by the processor, further cause the at least one processor to select and use, for each of the focal lengths of the lens, information corresponding to an in-focus position at which an amount of pincushion aberration becomes maximum.

7. The apparatus according to claim 1,
wherein the instructions, when executed by the processor, further cause the at least one processor to:
correct the distortion of the captured image using the first information; and
enlarge, based on the second information, the image in which the distortion has been corrected.

8. The apparatus according to claim 7,
wherein the instructions, when executed by the processor, further cause the at least one processor to:
not enlarge the image in which the distortion has been corrected, in a case where the distortion is a barrel distortion; and
enlarge the image in which the distortion has been corrected, in a case where the distortion is a pincushion distortion.

9. The apparatus according to claim 7,
wherein the instructions, when executed by the processor, further cause the at least one processor to:
not enlarge the image in which the distortion has been corrected, in a case where a focal length of the lens is a first focal length; and
enlarge the image in which the distortion has been corrected, in a case where the focal length of the lens is a second focal length different from the first focal length.

10. The apparatus according to claim 1,
wherein the first information includes a distortion correction value, and the second information includes information indicating a shift amount of the distortion correction value; and
wherein the instructions, when executed by the processor, further cause the at least one processor to:
determine a new distortion correction value by changing the distortion correction value, indicated by the first information, by the shift amount indicated by the second information; and
generate an image in which the distortion is corrected using the new distortion correction value.

11. The apparatus according to claim 10,
wherein the instructions, when executed by the processor, further cause the at least one processor to:
not change the distortion correction value indicated by the first information in a case where the distortion does not include a pincushion distortion; and
change the distortion correction value, indicated by the first information, by the shift amount indicated by the second information in a case where the distortion includes the pincushion distortion.

12. The apparatus according to claim 10,
wherein the instructions, when executed by the processor, further cause the at least one processor to:
not change the distortion correction value indicated by the first information in a case where a focal length of the lens is a first focal length; and
change the distortion correction value, indicated by the first information, by the shift amount indicated by the second information in a case where the focal length of the lens is a second focal length different from the first focal length.

13. The apparatus according to claim 12, wherein the shift amount indicated by the second information is a value for changing the distortion correction value indicated by the first information in such a manner that, at every image height, a correction value for shrinking, in a diagonal direction, the image in which the distortion has been corrected is eliminated.

14. The apparatus according to claim 1, wherein the instructions, when executed by the processor, further cause the at least one processor to generate the image in which the distortion is corrected, using the first information without using the second information in a case where the captured image is a still image.

15. The apparatus according to claim 1, wherein the instructions, when executed by the processor, further cause the at least one processor to generate the image in which the distortion is corrected, using the first information without using the second information in a case where information corresponding to the second information is not acquired.

16. The apparatus according to claim 15, wherein the instructions, when executed by the processor, further cause the at least one processor to determine whether the information corresponding to the second information is acquired based on flag information.

17. The apparatus according to claim 15, wherein the instructions, when executed by the processor, further cause the at least one processor to perform predetermined notification in generating the image in which the distortion is corrected using the first information without using the second information.

18. The apparatus according to claim 1, wherein the instructions, when executed by the processor, further cause the at least one processor to acquire the first information and the second information from a lens apparatus attached to an attachment mechanism from or to which the lens apparatus is detachable or attachable.

19. An apparatus comprising:
an image capturing unit configured to capture an optical image formed via a lens apparatus and generate an image;
at least one processor; and a memory including instructions that, when executed by the processor, cause the at least one processor to:

acquire first information about a correction value for correcting a distortion of the image generated by the image capturing unit and second information for correcting a change in an angle of view which is caused by the correction of the distortion; and generate, using the first information and the second information, an image in which the distortion is corrected.

20. A lens apparatus attachable to and detachable from an apparatus, the lens apparatus comprising:

a storage circuit configured to store first information about a correction value for correcting a distortion arising from the lens apparatus and second information for correcting a change in an angle of view which is caused by the correction of the distortion; and a communication circuit configured to communicate the first information and the second information to the apparatus.

21. The lens apparatus according to claim 20, wherein the first information includes information about individual combinations of focal lengths and in-focus positions of the lens, and wherein the second information includes information, which does not correspond to the in-focus positions of the lens and corresponds to the focal lengths of the lens.

22. The lens apparatus according to claim 21, wherein the information corresponding to each of the focal length of the lens is information based on an in-focus position at which an amount of pincushion aberration becomes maximum at a corresponding one of the focal lengths.

23. The lens apparatus according to claim 20, wherein the first information includes a correction value for correcting the distortion, and wherein the second information includes an image enlargement rate.

24. The lens apparatus according to claim 23, wherein, in a case where a focal length of the lens apparatus is a first focal length, the second information indicates that an image is not enlarged, and wherein, in a case where the focal length of the lens apparatus is a second focal length different from the first focal length, the second information indicates that the image is enlarged.

25. The lens apparatus according to claim 24, wherein the first focal length is a focal length at which the distortion arising from the lens apparatus does not include a pincushion distortion, and wherein the second focal length is a focal length, at which the distortion arising from the lens apparatus includes the pincushion distortion.

26. The lens apparatus according to claim 20, wherein the first information is a correction value for correcting the distortion, and wherein the second information is a shift amount for the correction value.

27. The lens apparatus according to claim 26, wherein, in a case where a focal length of the lens apparatus is the first focal length, the second information indicates the correction value is not shifted, and wherein, in a case where the focal length of the lens apparatus is a second focal length different from the first focal length, the second information indicates the correction value is shifted.

28. The lens apparatus according to claim 27, wherein the first focal length is a focal length at which the distortion arising from the lens apparatus does not include a pincushion distortion, and wherein the second focal length is a focal length, at which the distortion arising from the lens apparatus includes the pincushion distortion.

29. The lens apparatus according to claim 26, wherein the shift amount indicated by the second information is a value for changing the distortion correction value indicated by the first information in such a manner that, at every image height, a correction value for shrinking, in a diagonal direction, the image in which the distortion has been corrected is eliminated.

30. A method which is executed by an apparatus, the method comprising:

acquiring first information about a correction value for correcting a distortion of an image acquired by capturing an optical image formed by a lens and second information for correcting a change in an angle of view which is caused by the correction of the distortion; and generating an image in which the distortion is corrected using the first information and the second information.

31. A non-transitory computer-readable storage medium having stored thereon a program that, when executed by a computer, causes the computer to:

acquire first information about a correction value for correcting a distortion of an image acquired by capturing an optical image formed by a lens and second information for correcting a change in an angle of view which is caused by the correction of the distortion; and generate an image in which the distortion is corrected using the first information and the second information.

* * * * *